US008495234B2

(12) United States Patent
Bryant-Rich et al.

(10) Patent No.: US 8,495,234 B2
(45) Date of Patent: Jul. 23, 2013

(54) STORAGE DEVICE WITH MULTIMEDIA INTERFACE CONNECTOR

(75) Inventors: Donald Ray Bryant-Rich, Haifa (IL); Amir Aharonovich, Givatayim (IL)

(73) Assignee: Sandisk IL Ltd., Kfar Saba (IL)

( * ) Notice: Subject to any disclaimer, the term of this patent is extended or adjusted under 35 U.S.C. 154(b) by 456 days.

(21) Appl. No.: 12/493,445

(22) Filed: Jun. 29, 2009

(65) Prior Publication Data

US 2010/0332569 A1  Dec. 30, 2010

(51) Int. Cl.
*G06F 15/16* (2006.01)
*H04H 60/32* (2008.01)

(52) U.S. Cl.
USPC .............................. 709/231; 379/902; 725/14

(58) Field of Classification Search
USPC .......................................................... 709/231
See application file for complete search history.

(56) References Cited

U.S. PATENT DOCUMENTS

| 7,509,390 | B1* | 3/2009 | Raman et al. | 709/213 |
|---|---|---|---|---|
| 2005/0094825 | A1* | 5/2005 | Loness et al. | 381/82 |
| 2005/0146995 | A1 | 7/2005 | Morita | |
| 2005/0154766 | A1* | 7/2005 | Huang et al. | 707/104.1 |
| 2005/0278766 | A1* | 12/2005 | Benco et al. | 725/104 |
| 2007/0133673 | A1 | 6/2007 | Imaizumi | |
| 2007/0153132 | A1* | 7/2007 | Jong | 348/705 |
| 2007/0260808 | A1 | 11/2007 | Raines et al. | |
| 2008/0005424 | A1 | 1/2008 | Raines | |
| 2008/0107023 | A1* | 5/2008 | Kang | 370/232 |
| 2009/0034607 | A1* | 2/2009 | MacInnis | 375/240.01 |

FOREIGN PATENT DOCUMENTS

| EP | 1583363 A1 | 10/2005 |
|---|---|---|
| WO | 2005069614 A1 | 7/2005 |

OTHER PUBLICATIONS

International Search Report and Written Opinion of International Application No. PCT/US2009/053143, dated Feb. 26, 2010, 16 pages.

* cited by examiner

*Primary Examiner* — Jeong S Park
(74) *Attorney, Agent, or Firm* — Toler Law Group, PC

(57) ABSTRACT

Storage devices with multimedia interface connectors and methods are disclosed. In a particular embodiment, a data storage device includes a controller coupled to a memory, a streaming media capture circuit coupled to the controller, and a video playback circuit coupled to the controller. A multimedia interface connector is coupled to the streaming media capture circuit and further coupled to the video playback circuit. In response to detecting streaming multimedia data incoming from an external device via the multimedia interface connector, the incoming streaming multimedia data is provided to the streaming media capture circuit to generate multimedia file format data that is stored to the memory as a multimedia file.

25 Claims, 5 Drawing Sheets

STORAGE DEVICE WITH MULTIMEDIA INTERFACE CONNECTOR

FIELD OF THE DISCLOSURE

The present disclosure is generally related to storage devices.

BACKGROUND

Non-volatile memory devices, such as Universal Serial Bus (USB) Flash memory devices or removable storage cards, have allowed for increased portability of data and software applications. For example, Flash memory devices have been used to store multimedia files for use in portable multimedia players. Multimedia files can contain video data, audio data, picture data, or other forms of multimedia data. The multimedia data is often compressed or encoded for efficient file transfer and storage. However, recording and transferring multimedia data from one device to another, such as by recording multimedia data from a personal computer and transferring the recorded multimedia data to a television or other media player, may require a user to navigate multiple interface types and encoding formats and may impact the user experience.

SUMMARY

Systems and methods to transfer streaming multimedia data using a data storage device having a multimedia interface connector, such as a High-Definition Multimedia Interface (HDMI) connector, are disclosed. The data storage device may determine when the multimedia interface connector is receiving streaming multimedia from an external device. When incoming streaming multimedia data from the external device is detected, the data storage device can convert the incoming streaming multimedia data to a multimedia file format and store the converted multimedia data in a multimedia file. When incoming streaming multimedia data is not detected from the external device, the data storage device can initiate playback of a stored multimedia file to provide streaming multimedia data to the external device. The data storage device may also have one or more connectors or interfaces, such as a USB receptacle, that enable multimedia file transfer to an external device without requiring a conversion of the file to streaming multimedia data.

DETAILED DESCRIPTION

Figure 1:
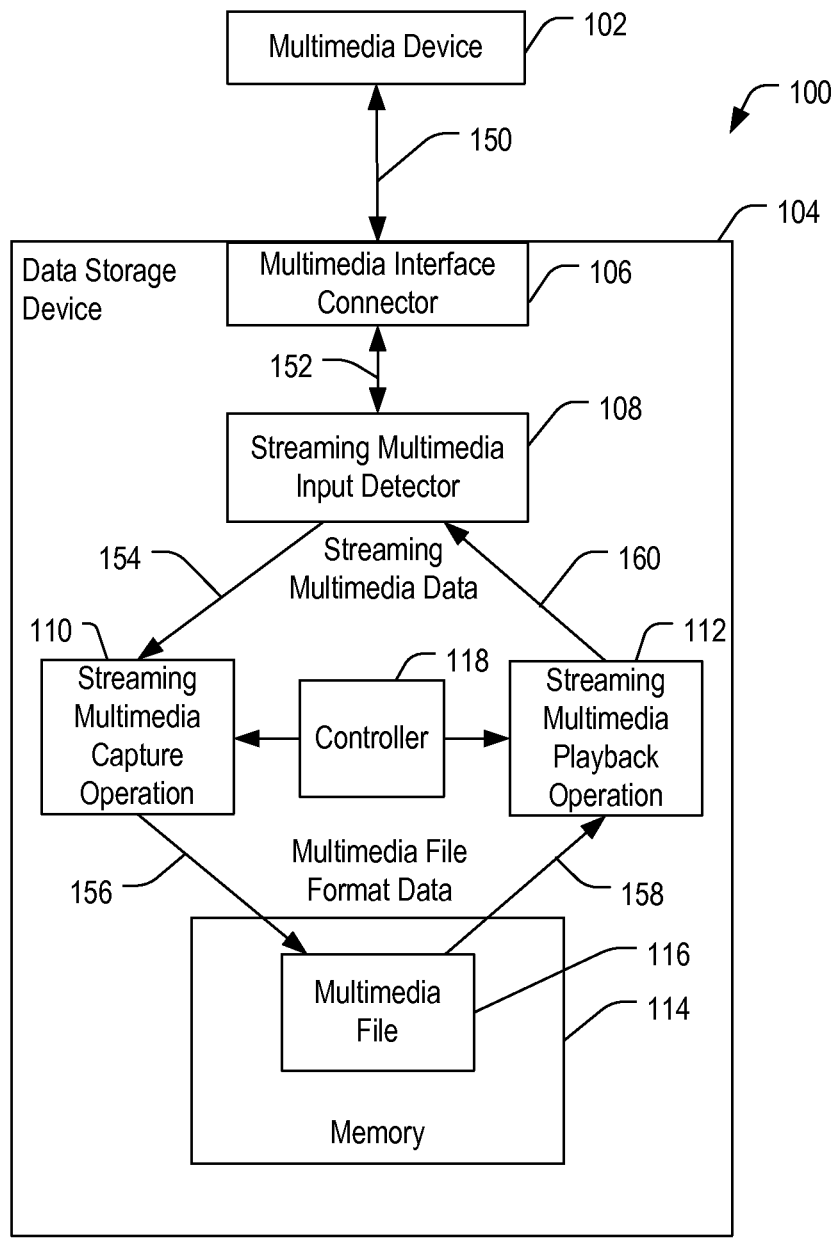
FIG. 1 is a block diagram of a first embodiment of a system including a data storage device having a multimedia interface connector.

Referring to FIG. 1, a particular embodiment of a system including a data storage device having a multimedia interface connector is depicted and generally designated 100. The system 100 includes a data storage device 104 having a multimedia interface connector 106 coupled to a multimedia device 102. The data storage device 104 also includes a streaming multimedia input detector 108 that is coupled to the multimedia interface connector 106. The data storage device 104 also includes a controller 118 and a memory 114, such as Flash memory. In a particular embodiment, the data storage device 104 is configured to detect incoming streaming multimedia data at the streaming multimedia input detector 108 and perform a streaming multimedia capture operation 110 to store the incoming streaming multimedia data as a multimedia file 116 at the memory 114. The data storage device 104 may also be configured to automatically detect a connection to the multimedia device 102, and when the multimedia device 102 is not providing streaming multimedia data to the data storage device 104, the data storage device 104 automatically converts the multimedia file 116 to streaming multimedia data via a streaming multimedia playback operation 112. As a result, the data storage device 104 may enable streaming multimedia data storage and playback.

The multimedia interface connector 106 is configured to enable transfer of streaming multimedia data 150 to and from the multimedia device 102. The multimedia interface connector 106 is further configured to transfer streaming multimedia data 152 to and from the streaming multimedia input detector 108. The streaming multimedia data 150 may include multiple channels of data including video data, audio data, and control data. The multimedia interface connector 106 may be a High-Definition Multimedia Interface (HDMI) connector. For example, the streaming multimedia data 150 may include three parallel channels to serially transmit a pixel's color channel values (e.g. red/green/blue (RGB) or luma/chroma-blue/chroma-red (YCbCr) pixel values) during a single cycle of a clock signal that is transmitted with the streaming multimedia data. In addition, audio data, auxiliary data, or both may be streamed using a packet structure. Each data channel and the clock channel may include one or more differential signaling pairs, and data may be encoded along with error correction data via a Transition Minimized Differential Signaling (TMDS) protocol. Streaming video data may therefore be uncompressed video data that includes a full bit-value for each color channel of each pixel and is transferred at a rate that substantially complies with a streaming video data transfer rate, such as a high-definition standard video rendering/display rate.

The streaming multimedia input detector 108 may be configured to determine whether streaming multimedia data is being received from the multimedia device 102. Upon detecting that streaming multimedia data is being received at the multimedia interface connector 106, the streaming multimedia input detector 108 may be configured to provide streaming multimedia data 154 to be converted into the multimedia file 116 via the streaming multimedia capture operation 110. The streaming multimedia input detector 108, upon determining that streaming multimedia data is not incoming at the multimedia interface connector 106, may be configured to receive streaming multimedia data 160 from the streaming multimedia playback operation 112. The received streaming multimedia data 160 may be routed to the multimedia interface connector 106 to be provided as outgoing streaming multimedia data 150 to the multimedia device 102.

The controller 118 may be configured to control the streaming multimedia capture operation 110 and the streaming multimedia playback operation 112. For example, the controller 118 may detect a connection of the multimedia device 102 to the multimedia interface connector 106 such as by testing one or more signals received via the multimedia interface connector 106. The controller 118 may also initiate the streaming multimedia capture operation 110 in response to a determination of the streaming multimedia input detector 108 that the multimedia device 102 is providing incoming streaming multimedia data. The multimedia capture operation 110 may include encoding the streaming multimedia data 154 to a multimedia file format to generate multimedia file format data 156 that is stored at the memory 114 as the multimedia file 116. As an illustrative example, the streaming multimedia data 154 may be provided to an encoder that converts streaming multimedia data to multimedia file format data. For example, the streaming multimedia data 154 may be provided to a H.264 encoder, a Motion Picture Expert Group (MPEG) encoder, such as an MP3 encoder, or another multimedia data encoder.

The controller 118 may also be configured to determine, in response to detecting the multimedia device 102 and not detecting incoming multimedia data from the multimedia device 102, that content of the multimedia file 116 is to be provided as streaming multimedia data to the multimedia device 102. The controller 118 may be configured to initiate the streaming multimedia playback operation 112, providing multimedia file format data 158 from the multimedia file 116 to be converted from the multimedia file format data 158 to streaming multimedia data 160. As an illustrative example, the multimedia file format data 158 may be provided to a decoder that converts multimedia file format data to streaming multimedia data. For example, the multimedia file format data 158 may be provided to a H.264 decoder, an MPEG decoder, such as an MP3 decoder, or another multimedia data decoder. Content of the streaming multimedia data 160 may be provided to the multimedia device 102 via the multimedia interface connector 106.

The memory 114 may be a solid state memory, such as a flash memory. Alternatively, or in addition, the memory 114 may include another type of memory such as a hard drive. The memory 114 may be configured to store one or more data files, such as the representative multimedia file 116. As an illustrative, non-limiting example, the memory 114 may store additional multimedia file format data, metadata, program instructions that are executable by the controller 118, or other data.

During operation, the data storage device 104 may detect that the multimedia device 102 is coupled to the data storage device 104 via the multimedia interface connector 106. The streaming multimedia input detector 108 may determine whether multimedia data is being streamed to the data storage device 104 via the multimedia interface connector 106. In response to detecting incoming streaming multimedia data, the streaming multimedia capture operation 110 may be initiated to convert incoming streaming multimedia data 154 to multimedia file format data 156 to be stored at the memory 114 as the multimedia file 116. Detection and conversion of the incoming streaming multimedia data to multimedia file format data and storing the multimedia file format data to the memory 114 may be performed automatically, i.e. in absence of user input. For example, a user may connect the data storage device 104 to a streaming multimedia output connector of the multimedia device 102, and the data storage device 104 may automatically detect incoming streaming multimedia data 150 and automatically store the incoming streaming multimedia data as the multimedia file 116 by providing the incoming streaming multimedia data 150 to an encoder that encodes streaming multimedia data to a multimedia file format. Multimedia file format data generated by the encoder is stored in the multimedia file 116.

After storing the multimedia file 116, a user may connect the data storage device 104 to another multimedia device 102, such as a television, via the multimedia interface connector 106. The data storage device 104 may detect the connection and may also determine at the streaming multimedia input detector 108 that no incoming streaming multimedia data is being received from the multimedia device 102. In response to such determination, the streaming multimedia playback operation 112 may be automatically initiated to convert multimedia file format data 158 of the multimedia file 116 into the streaming multimedia data 160 to be provided to the multimedia device 102 via the multimedia interface connector 106. For example, the multimedia file format data 158 may be provided to a multimedia decoder that generates decoded multimedia data having a streaming multimedia format. In this manner, streaming multimedia data 150 may be provided automatically to the multimedia device 102 upon connection of the data storage device 104 to the multimedia device 102 via the multimedia interface connector 106.

By automatically detecting incoming streaming multimedia data, the data storage device 104 enables user-friendly streaming multimedia capture and playback functionality. For example, the data storage device 104 may operate substantially as a portable Flash device having the multimedia interface connector 106, such as an HDMI connector. A user may connect the data storage device 104 to a multimedia source, such as a HDMI video source (e.g. a cable or satellite receiver or set-top box device or a high-definition digital video disc device (HD DVD)) and record the video feed directly to the drive, automatically storing the received streaming multimedia data as a multimedia file at the memory 114. The user may later couple the data storage device 104 to a second multimedia device, such as a television, and automatically stream multimedia data that is converted from multimedia data that is stored at the file 116 to the second multimedia source. The streaming multimedia capture operation 110 can process streaming multimedia data according to a first streaming protocol, such as a HDMI protocol associated with an HDMI connector, and multimedia data can be generated during the streaming multimedia playback operation 112 according to the first streaming protocol via the same HDMI connector. By using a common protocol and common connector for both streaming multimedia capture and playback, a device size and a cost of manufacture may be decreased and a user experience may be enhanced.

Figure 2:
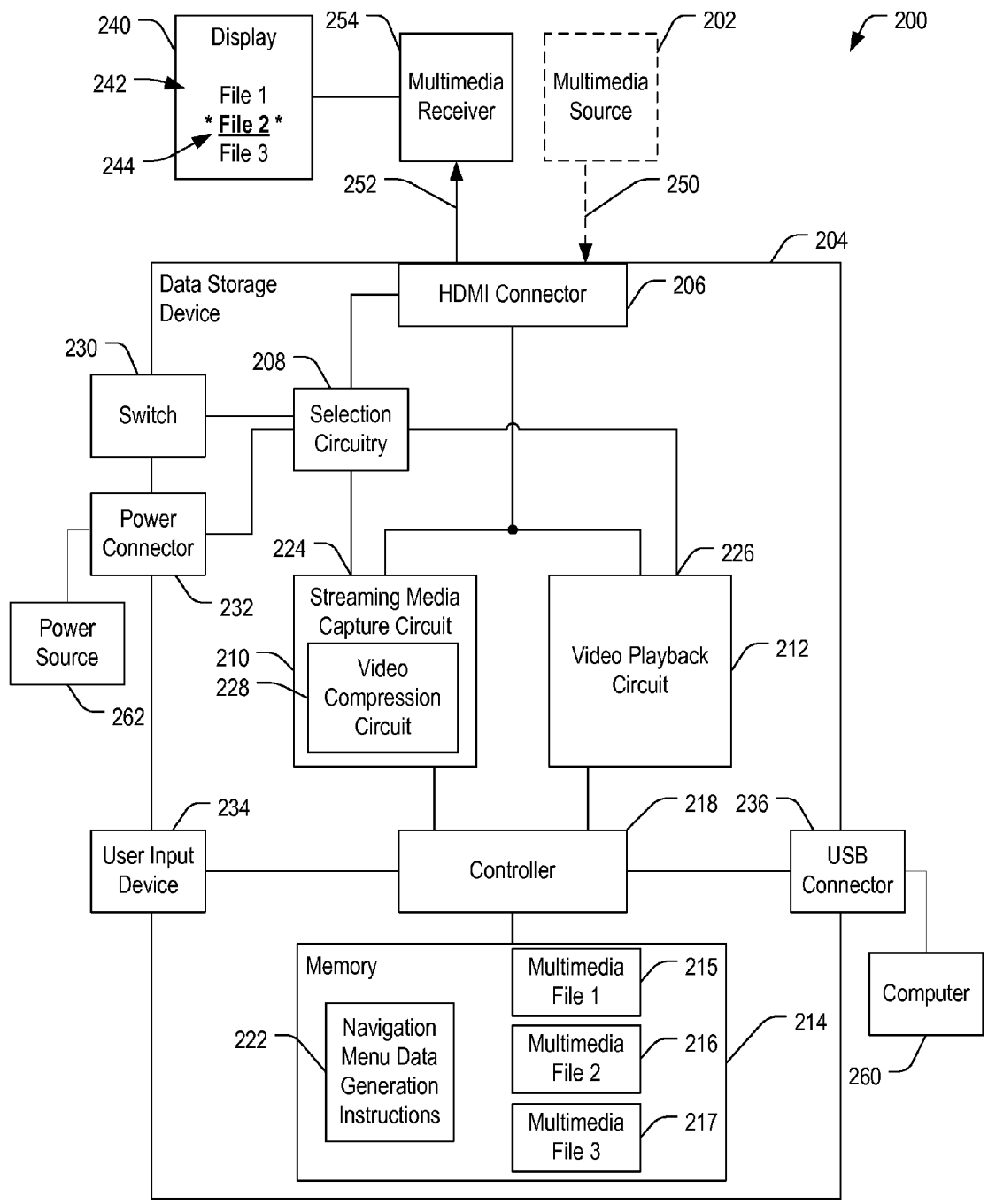
FIG. 2 is a block diagram of a second embodiment of a system including a data storage device having a multimedia interface connector.

Referring to FIG. 2, a second particular embodiment of a system including a data storage device having a multimedia interface connector is depicted and generally designated 200. The system 200 includes an optional multimedia source 202 coupled to a data storage device 204. The data storage device 204 is further coupled to a multimedia receiver 254. The multimedia receiver 254 is coupled to a display 240. As an illustrative, non-limiting example, the data storage device 204 may be the data storage device 104 of FIG. 1.

The data storage device 204 includes a multimedia interface connector, such as a High-Definition Multimedia Interface (HDMI) connector 206. The HDMI connector 206 is coupled to a video playback circuit 212 and is also coupled to a streaming media capture circuit 210. The video playback circuit 212 and the streaming media capture circuit 210 are coupled to a controller 218, which in turn is coupled to a memory 214. The controller 218 is also coupled to a user input device 234 and to a second connector 236, such as a Universal Serial Bus (USB) connector. The data storage device 204 also includes selection circuitry 208 coupled to an external switch 230 and to an external power connector 232.

The selection circuitry 208 is also coupled to the HDMI connector 206 and to the streaming media capture circuit 210.

The streaming media capture circuit 210 may be configured to receive streaming media that is incoming via the HDMI connector 206 and to convert the incoming streaming media to a multimedia file format. The streaming media capture circuit 210 may include a video compression circuit 228. The streaming media capture circuit 210, including the video compression circuit 228, may include at least a portion of a video coder-decoder (CODEC) circuit. The streaming media capture circuit 210 may be configured to provide the multimedia file format data to be stored at the memory 214 via the controller 218. The streaming media capture circuit 210 may include an enable input 224 that is responsive to the selection circuitry 208. The streaming media capture circuit 210 may be responsive to a signal at the enable input 224 to initiate a streaming media capture operation that encodes the streaming multimedia data at a CODEC circuit that encodes streaming multimedia data to generate multimedia file format data.

The video playback circuit 212 may be configured to receive multimedia file format data and to convert the received multimedia file format data to streaming multimedia data that is provided to the HDMI connector 206 to be transmitted to an external device, such as the multimedia receiver 254. The video playback circuit 212 may include at least a portion of a CODEC circuit, such as a H.264 COCEC, a Motion Picture Expert Group (MPEG) CODEC, such as an MP3 CODEC, one or more other CODECs, or any combination thereof. The video playback circuit 212 may have an enable input 226 that is coupled to the selection circuitry 208. The video playback circuit 212 may be responsive to a signal received at the enable input 226 to initiate video playback by receiving multimedia file data and converting the multimedia file data to streaming multimedia data to be provided to the HDMI connector 206 by decoding the multimedia file data at a CODEC circuit that decodes multimedia file data to generate streaming multimedia data.

The controller 218 may be configured to enable storage of multimedia file format data generated by the streaming media capture circuit 210 as one or more multimedia files at the memory 214. For example, the controller 218 may be configured to receive multimedia file format data and to store the multimedia file format data at a first representative multimedia file 215, a second representative multimedia file 216, or a third representative multimedia file 217 at the memory 214. In addition, the controller 218 may be configured to retrieve multimedia file format data from the memory 214, such as data stored at the first multimedia file 215, to be provided to the video playback circuit 212 to generate streaming media data for transmission to the multimedia receiver 254.

The controller 218 may be configured to provide file access to the memory 214 to an external device 260 that is coupled to the data storage device 204 via the second connector 236. For example, the external device 260 may be a computer, such as a personal computer (PC). Upon connection of the external device 260 to the data storage device 204 via the second connector 236, the controller 218 may be configured to provide to the external device 260 at least one of a file read access or a file write access to the memory 214 via the second connector 236 to enable multimedia file transfer to and from the external device 260. File transfer to and from the external device 260 via the second connector 236 may be performed without conversion of multimedia file format data to streaming multimedia data.

The controller 218 may be responsive to a user input device 234. For example, the user input device 234 may include one or more selectable controls at the data storage device 204, such as one or more buttons, switches, scroll wheels, touch screen devices, one or more other input devices including remote input devices such as an IrDA controller, or any combination thereof. The controller 218 may be responsive to user input via the input device 234 such as control input to control execution of navigation menu data generation instructions 222 that may be stored at the memory 214. For example, upon detection of a connection of the data storage device 204 to an external device, such as the multimedia receiver 254 or the external device 260, the controller 218 may be configured to execute navigation menu generation instructions 222 to generate a menu of multimedia files that are stored at the memory 214 and that may be available for file transfer to the external device.

To illustrate, when the data storage device 204 is coupled to the multimedia receiver 254, the controller 218 may execute the navigation menu data generation instructions 222 to send navigation menu data to the multimedia receiver 254 to be displayed at a menu 242 at the display 240 coupled to the multimedia receiver 254. The navigation menu data may be included in streaming multimedia data 252 that is sent to the multimedia receiver 254. For example, the multimedia receiver 254 may be a television that is not capable of communicating user selections and instructions to the data storage device 204. The menu 242 may include one or more selectable menu options associated with the multimedia data files 215-217 stored at the memory 214. The user input device 234 may enable a user to navigate the menu 242 and to select one or more of the menu options, such as the representative menu option 244 indicating the second multimedia file 216. The controller 218 may be configured to be responsive to the user input received via the user input device 234, such as via a state of the user input device 234, to modify the navigation menu data and to initiate data retrieval of the multimedia file 216 to be provided to the video playback circuit 212 to generate streaming multimedia data that is provided as the streaming multimedia data 252 to the multimedia receiver 254.

The selection circuitry 208 may be configured to selectively enable the video playback circuit 212 or the streaming media capture circuit 210. The selection circuitry 208 may be coupled to the external switch 230 and may be responsive to a state of the external switch 230. To illustrate, the external switch 230 may include a user input device that enables a user of the data storage device 204 to indicate whether multimedia data is to be received from an external device, such as from the multimedia source 202, or provided to an external device, such as provided as streaming multimedia data 252 to the multimedia receiver 254. Alternatively, or in addition, the selection circuitry 208 may be configured to be responsive to the external power connector 232. For example, the selection circuitry 208 may be responsive to the external power connector 232 being coupled to an external power source 262. To illustrate, when the data storage device 204 is coupled to the external power source 262, the selection circuitry 208 may enable operation of the video playback circuit 212. However, when the external power source 262 is not coupled to the external power connector 232, the selection circuitry 208 may disable video playback at the video playback circuit 212 to conserve battery resources at the data storage device 204. In another example, the selection circuitry 208 may be responsive to a signal that is received via the HDMI connector 206 to determine whether incoming multimedia data is being received via the HDMI connector 206. Detecting streaming multimedia data incoming from an external device may include testing of one or more signals that are received via the HDMI connector 206. For example, a signal may indicate a power level, may include a clock signal, or may include a hot-plug connection signal indication, as will be described with respect to FIG. 4.

During operation, in response to detecting streaming multimedia data incoming from an external device via the multimedia interface connector, the incoming streaming multimedia data is provided to the streaming media capture circuit 210 to generate multimedia file format data. For example, the data storage device 204 may be coupled to the multimedia source 202. The multimedia source 202 may start streaming incoming multimedia data 250 to the HDMI connector 206. The selection circuitry 208 may enable the streaming media capture circuit 210 to convert the incoming multimedia streaming data 250 to a multimedia file data format to be stored at the memory 214 as a multimedia file.

The data storage device 204 may be de-coupled from the multimedia source 202 and coupled to the multimedia receiver 254. The selection circuitry 208 may enable the video playback circuit 212 to provide streaming multimedia data 252 to the multimedia receiver 254. The streaming multimedia data 252 may be selected via a navigation menu 242 that is provided by the data storage device 204 to the multimedia receiver 254 upon detection of connection of the multimedia receiver 254 and absent detection of incoming streaming multimedia data at the HDMI connector 206. For example, when multiple multimedia files such as the multimedia files 215-217 are stored at the memory 214, the controller 218 may execute the navigation menu data generation instructions 222 to enable a user to navigate the file menu 242 and to select the file menu option 244 via the user input device 234. Whether the data storage device 204 is to operate as a data sink, i.e., to receive streaming data to be stored as a multimedia file data, or as a data source, i.e., to generate and provide streaming multimedia data to an external device, may be determined at least in part via the selection circuitry 208 in response to a state of the external switch 230, the external power connector 232, one or more signals at the HDMI connector 206, or any combination thereof.

Although the data storage device 204 is illustrated as including the switch 230, in other embodiments the data storage device 204 may not include an external switch. For example, the data storage device 204 may instead enable detection of incoming streaming multimedia data by testing one or more signals at the HDMI connector 206, in response to detection of the external power source 262 to the external power connector 232, or any combination thereof.

Although the power connector 232 is illustrated as coupled to the selection circuitry 208, in other embodiments the selection circuitry 208 may not be responsive to connection of the external power source 262 to the external power connector 232. For example, a determination of whether to provide streaming multimedia data to an external device may be performed at the selection circuitry 208 independent of a status of the connection of the external power source 262 to the power connector 232.

Although the user input device 234 is depicted as part of the data storage device 204, in other embodiments the data storage device 204 may not include the user input device 234. For example, the data storage device 204 may instead include a wireless transceiver to receive menu navigation and selection commands from a remote control device. Alternatively, the data storage device 204 may not be responsive to user input to control selection of multimedia data to be streamed. To illustrate, the data storage device 204 may be configured to provide streaming multimedia data that corresponds to a most recently stored multimedia file. As another example, the data storage device 204 may be configured to store a single multimedia file, and the controller 218 may retrieve the single stored multimedia file for video playback as streaming data. As yet another example, the controller 218 may be configured to determine an earliest stored multimedia file at the memory 214 for video playback. In yet another embodiment, the data storage device 204 may be responsive to a selection of signals that are received via the HDMI connector 206, via the second connector 236, or any combination thereof, to determine a multimedia file to be provided as streaming multimedia data 252 to the multimedia receiver 254.

Although data transfer with the external device 260 is described as performed via the second connector 236 such as a USB connector, in other embodiments data communication with the external device 260 may be performed via the HDMI connector 206, via a local area network (LAN) wireline or wireless protocol that supports streaming multimedia data transfer, such as a HDMI LAN protocol, or any combination thereof.

Figure 3:
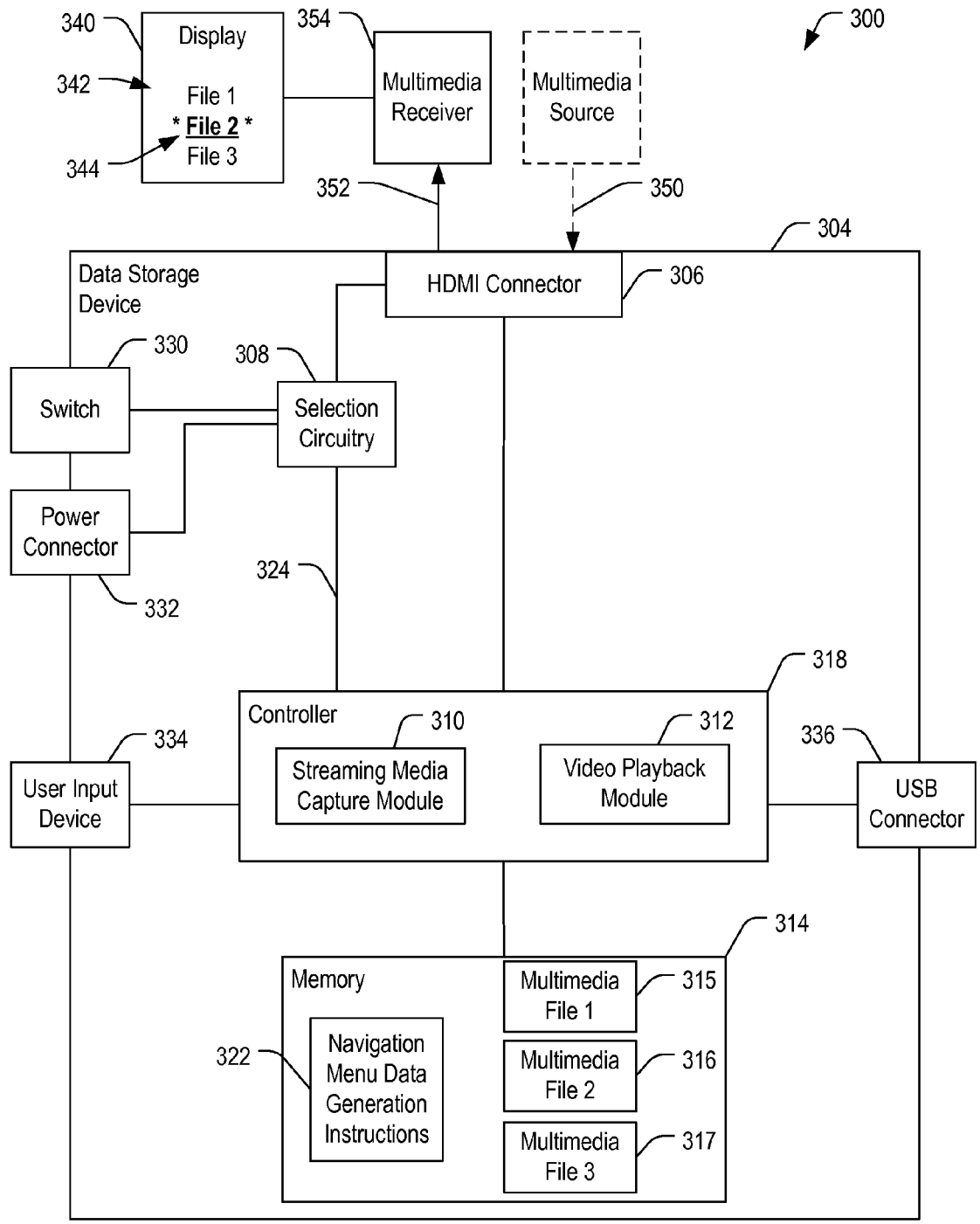
FIG. 3 is a block diagram of a third embodiment of a system including a data storage device having a multimedia interface connector.

Referring to FIG. 3, a third particular embodiment of a system including a data storage device having a high-definition multimedia interface (HDMI) connector 306 is depicted and generally designated 300. The data storage device 304 including the HDMI connector 306 is illustrated as receiving streaming multimedia data 350 from a multimedia source or providing streaming multimedia data 352 to a multimedia receiver 354 for display at a display device 340. The display device 340 is illustrated as including a menu 342 that a user of the data storage device 304 may navigate to select a particular menu option, such as the selected menu option 344 representing a second multimedia file 316 that is stored at a memory 314 of the data storage device 304. As an illustrative, non-limiting example, the data storage device 304 may correspond to the data storage device 104 of FIG. 1, the data storage device 204 of FIG. 2, or any combination thereof. The multimedia receiver 354 may correspond to the multimedia receiver 254 of FIG. 2.

The data storage device 304 includes the HDMI connector 306 coupled to a controller 318. The HDMI connector 306 is also coupled to selection circuitry 308 that is coupled to the controller 318. The controller 318 is coupled to a user input device 334 and to a second connector 336, such as a Universal Serial Bus (USB) connector. The controller 318 is also coupled to the memory 314. The selection circuitry 308 is coupled to an external switch 330 and to an external power connector 332. The HDMI connector 306, the selection circuitry 308, the switch 330, the power connector 332, the user input device 334, the second connector 336, and the memory 314 may operate in a substantially similar manner as corresponding elements of the data storage device 204 of FIG. 2.

The controller 318 includes a streaming media capture module 310 and a video playback module 312. The streaming media capture module 310 may include executable instructions that are executed at the controller 318 to convert streaming media that is received by the HDMI connector 306 to multimedia file format data. For example, the streaming media capture module 310 may include a software CODEC or software video coder that is executed at the controller 318 and may include instructions that are executed at the controller 318 to encode streaming multimedia data by providing the streaming multimedia data to the software CODEC or to the software video coder to generate multimedia file format data. In another embodiment, the streaming media capture module 310 may include dedicated hardware, such as circuitry, one or more dedicated processors or co-processors, such as a digital signal processor (DSP), or any combination thereof, to perform at least a portion of a streaming media capture operation.

The video playback module 312 includes instructions executed at the controller 318 to convert multimedia file format data to streaming media data to be provided as the multimedia streaming data 352 to the multimedia receiver 354 via the HDMI connector 306. In another embodiment, the video playback module 312 may include dedicated hardware, such as circuitry, one or more dedicated processors such as a DSP or other co-processor, or any combination thereof, to perform at least a portion of a video playback operation. The video playback module 312 can be a software video CODEC or a software video decoder that is executed at the controller 318 and may include instructions that are executed at the controller 318 to decode multimedia file format data by providing the multimedia file format data to the software CODEC or to the software video decoder to generate streaming multimedia data.

During operation, the controller 318 may receive a signal 324 from the selection circuitry 308 indicating whether a streaming media capture operation or a video playback operation should be performed at the controller 318. For example, the selection circuitry 308 may determine, based on a setting of the switch 330, based on a connection to an external power source at the external power connector 332, by testing one or more signals incoming at the HDMI connector 306, or any combination thereof, that incoming streaming multimedia data 350 is received at the HDMI connector 306 from a streaming multimedia source and is to be captured and stored to the memory 314 as a multimedia file, such as the first representative multimedia file 315, the second representative multimedia file 316, or the third representative multimedia file 317. In response to the signal 324 from the selection circuitry 308, the controller 318 may be configured to initiate operation of the streaming media capture module 310.

The selection circuitry 308 may signal the controller 318 to indicate when the streaming multimedia capture operation is to end, such as when the incoming streaming multimedia data is no longer detected or when a connection to the multimedia source is no longer detected. Subsequently, the selection circuitry 308 may determine, based on a setting of the switch 330, based on a connection to an external power source at the external power connector 332, by testing one or more signals incoming at the HDMI connector 306, or any combination thereof, that the HDMI connector 306 is connected to the multimedia receiver 354 and that streaming multimedia data is not incoming from the multimedia receiver 354. In response, the selection circuitry 308 may signal the controller 318 to initiate execution of the video playback module 312 to provide streaming multimedia data 352 by converting multimedia file format data from one or more of the multimedia files 315-317 to streaming multimedia data. Selection of a particular multimedia file 315-317 for playback may be automatically determined or may be responsive to a user interaction with the menu 342 to navigate and select a menu option 344, such as via the user input device 334, in conjunction with the controller 318 executing the navigation menu data generation instructions 322.

Figure 4:
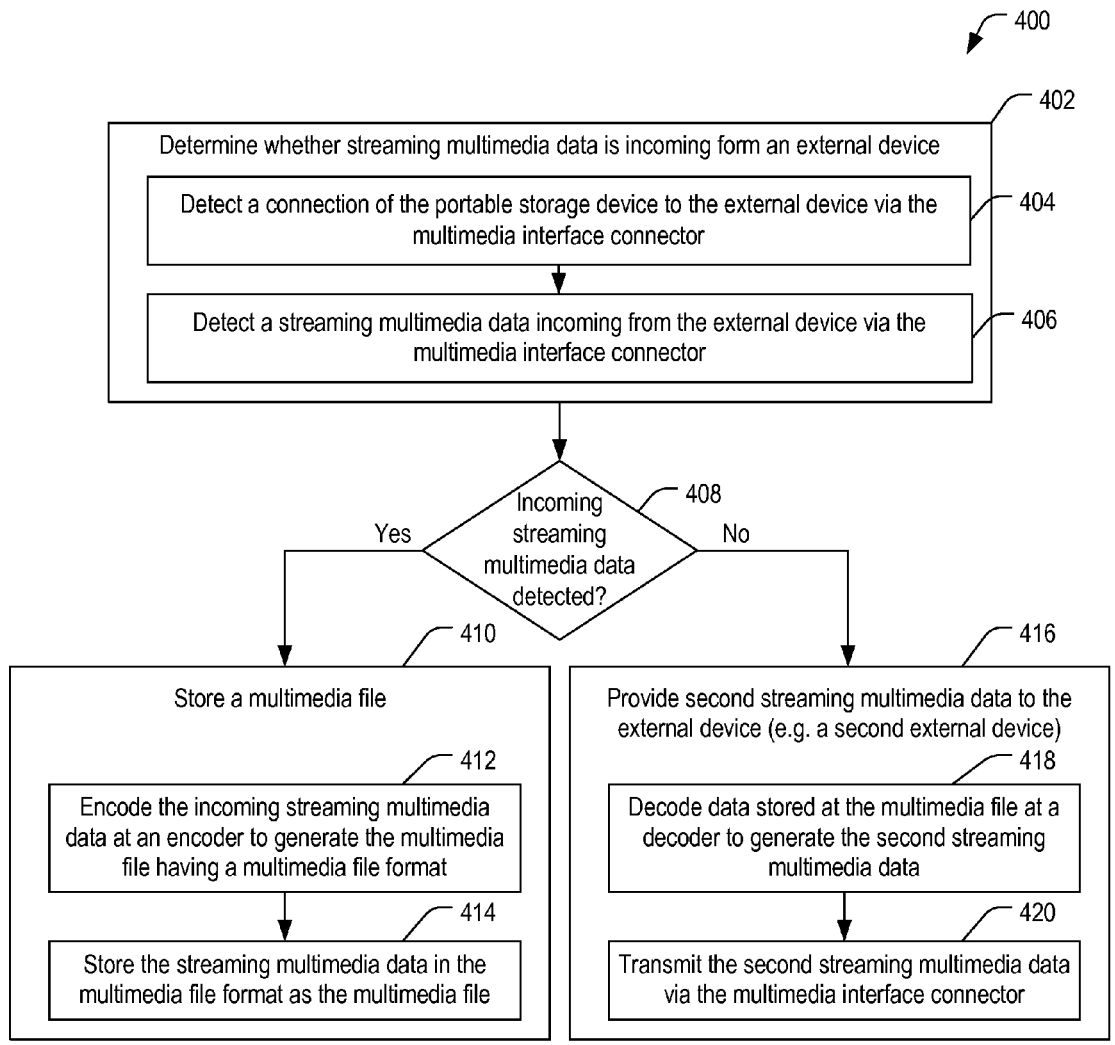
FIG. 4 is a flow diagram of a particular embodiment of a method of operation of a data storage device that includes a multimedia interface connector.

FIG. 4 is a flow diagram of a particular embodiment of a method of operation of a data storage device that includes a multimedia interface connector. For example, the data storage device may be a portable data storage device and the multimedia interface connector may be a high-definition multimedia interface (HDMI) connector. The method 400 may be performed by the data storage device 104 of FIG. 1, the data storage device 204 of FIG. 2, or the data storage device 304 of FIG. 3, as illustrative, non-limiting examples.

The method 400 includes determining whether streaming multimedia data is incoming from an external device, at 402. Determining whether streaming multimedia data is incoming from an external device may be performed by detecting a connection of the data storage device to the external device via the multimedia interface connector, at 404, and by detecting a streaming multimedia data incoming from the external device via the multimedia interface connector, at 406.

Detecting the connection of the data storage device to the external device can be performed by testing a signal that is received via the multimedia interface connector. For example, the signal may indicate a power level. Alternatively, or in addition, the signal may include a clock signal, a hot-plug connection signal, or any combination thereof. Detection may be performed by receiving any electrical signal, such as a voltage or current, via the multimedia interface device and identifying that the signal conforms to a connected condition. To illustrate, the external device can be detected by identifying and testing a signal that conforms to a specified voltage range or current range that indicates connection to an external device. As another illustration, the external device can be detected by identifying and testing a signal that does not satisfy a specified voltage range or current range associated with an unconnected condition.

In a particular embodiment, detecting the streaming multimedia data incoming from the external device includes testing a signal that is received via the multimedia interface connector. For example, the signal may indicate a power level, may include a clock signal, a hot-plug connection signal, or any combination thereof. To illustrate, the multimedia interface connector may include a HDMI connector and the external device may comply with a HDMI communication protocol that requires a streaming multimedia provider (source device) to provide a clock signal to a streaming multimedia receiver (sink device) via a differential signal at a pair of connecting pins designated as a clock channel. When the external device is detected as connected to the HDMI connector, a presence of a clock signal detected at the clock channel can indicate that the external device is a source device, while an absence of a detected clock signal at the clock channel can indicate that the external device is a sink device. As another example, the HDMI communication protocol may specify a sink device to detect a power supply of a source device and in response to assert a high voltage on a hot-plug connection pin. Thus, a detected voltage that is supplied at the hot-plug connection pin can indicate that the external device is a data sink, while an absence of the detected voltage at the hot-plug connection pin can indicate that the external device is a data source. As another example, the signal may include at least one of a video signal or an audio signal, and testing the signal can include analyzing or decoding at least a portion of the signal to identify the signal as including the video signal and/or the audio signal.

A determination is made whether incoming steaming multimedia data is detected, at 408. In response to detecting the incoming streaming multimedia data, a multimedia file is stored, at 410. Content of the stored multimedia file is accessible to a second external device as second streaming multimedia data. Storing the multimedia file may be performed by encoding the incoming streaming multimedia data at an encoder to generate the multimedia file having a multimedia file format, at 412, and by storing the converted streaming multimedia data in the multimedia file format as the multimedia file, at 414.

For example, the external device may include a video source and the incoming streaming multimedia data may include a video feed from the video source. The data storage device may include a video compression circuit that is coupled to the multimedia interface connector, such as the video compression circuit 228 of FIG. 2. The streaming multimedia data may be provided to the video compression circuit to be encoded by the video compression circuit to generate encoded multimedia data having the multimedia file format. Alternatively, or in addition, the data storage device may include a controller that executes instructions of a streaming media capture module, such as the steaming media capture module 310 of FIG. 3, to encode the streaming multimedia data to generate encoded multimedia data having the multimedia file format.

In response to not detecting the streaming multimedia data, at 408, streaming multimedia data may instead be provided to the external device, at 416. For example, after a first external device provides incoming streaming multimedia data that is converted and stored as the multimedia file at 414, the data storage device may determine whether streaming multimedia data is incoming from a second external device. The determination may be performed by detecting a second connection of the data storage device to the second external device via the multimedia interface connector and by testing a signal that indicates that no streaming multimedia data is incoming from the second external device via the multimedia interface connector. To illustrate, the second external device may be a television having a high-definition multimedia interface (HDMI) port.

In response to determining that no streaming multimedia data is incoming from the second external device, at 408, second streaming multimedia data may be provided to the second external device, at 416. The second streaming multimedia data may be provided to the second external device by decoding data stored at the multimedia file at a decoder to generate the second streaming multimedia data, at 418, and by transmitting the second streaming multimedia data via the multimedia interface connector, at 420.

For example, the external device may include a video sink such as a television. The data storage device may include a video playback circuit that is coupled to the multimedia interface connector, such as the video playback circuit 212 of FIG. 2. The multimedia file format data may be converted to streaming multimedia data by the video playback circuit. Alternatively, or in addition, the data storage device may include a controller that executes a video playback module, such as the video playback module 312 of FIG. 3, to convert the multimedia file format data to streaming multimedia data.

Figure 5:
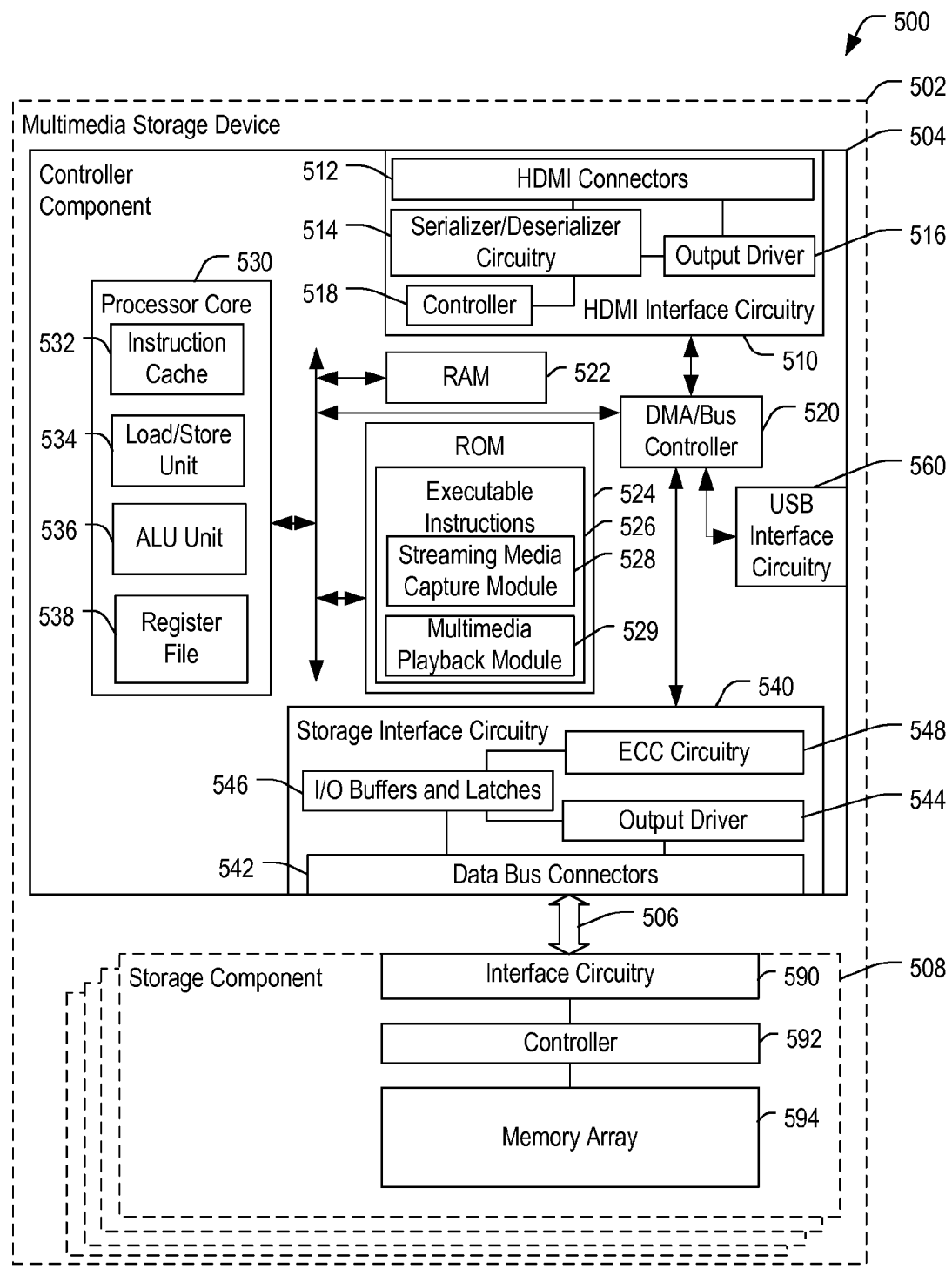
FIG. 5 is a block diagram of a particular embodiment of a system including a multimedia storage device having a multimedia interface connector.

FIG. 5 is a block diagram of a particular embodiment of a system including a multimedia storage device having a multimedia interface connector. The system 500 includes a multimedia storage device 502 that includes a controller component 504 coupled to one or more storage components, such as a representative storage component 508, via a bus 506. The representative storage component 508 includes interface circuitry 590 to communicate via the bus 506. The storage component 508 also includes a controller 592 that is coupled to the interface circuitry 590 and that is also coupled to a memory, such as a memory array 594. The memory array 594 may include one or more types of storage media such as a flash memory, a one-time programmable memory, other memory, or any combination thereof. As an illustrative, non-limiting example, the storage device 502 may be, or may operate substantially similarly to, the data storage device 104 of FIG. 1, the data storage device 204 of FIG. 2, the data storage device 304 of FIG. 3, or any combination thereof.

The controller component 504 includes HDMI interface circuitry 510 coupled to a direct memory access (DMA)/bus controller 520. The controller component 504 also includes storage interface circuitry 540 and USB interface circuitry 560 that are coupled to the DMA/bus controller 520. A processor core 530, a random access memory (RAM) 522, and a read-only memory (ROM) 524 are coupled to the DMA/bus controller 520 via an internal bus.

The HDMI interface circuitry 510 may include connectors 512 coupled to serializer/deserializer circuitry 514. For example, the connectors 512 may include electrical contacts to accommodate a 19- or 29-pin plug or receptacle and may have a form factor and electrical characteristics conforming to a HDMI specification, such as an HDMI Specification Version 1.3c Type A Connector, Type B Connector, or Type C Mini-Connector. The connectors 512 are further coupled to output driver circuitry 516. The HDMI interface circuitry 510 also includes a controller 518. The HDMI interface circuitry 510 may operate in accordance with a HDMI protocol.

For example, the controller 518 may be configured to enable data transmission as a HDMI source or sink. When functioning as a data source, the controller 518 may be programmed to receive multi-channel data via the DMA/Bus controller 520 to be transmitted, perform data processing including an error encoding operation, and provide the processed data to the serializer/deserializer circuitry 514 for multi-channel transition minimized differential signaling (TMDS) via the connectors 512. When functioning as a data sink, the controller 518 may be programmed to receive multi-channel data that was received via TMDS signaling at the connectors 512 and deserialized at the serializer/deserializer circuitry 514, perform data processing including an error check operation, and provide the processed data via the DMA/Bus controller 520. The controller 518 may include a hardware processor that executes instructions stored at an internal memory, such as a read-only memory (not shown) to enable receipt and acknowledgment of HDMI instructions and data, such as via a display data channel (DDC) or a consumer electronics channel (CEC). Alternatively, or in addition, the host interface circuitry 510 may be configured to support other communication protocols.

The processor core 530 may include an instruction cache 532, a load/store unit 534, an arithmetic logic unit (ALU) unit 536, and a register file 538. The processor core 530 may include, or may function substantially similarly to, a microcontroller core, as an illustrative, non-limiting example. For example, the processor core 530 may support a reduced instruction set computer (RISC) micro-architecture. The processor core 530 may be configured to retrieve data and executable instructions 526 via the load/store unit 534 from the read only memory 524. The executable instructions 526 may include instructions from a streaming media capture module 528 that are executable to convert streaming media received via the HDMI interface circuitry 510 to multimedia format data to be stored as a multimedia file at the memory array 594, by providing the streaming media to an encoder such as an MP3 CODEC to be encoded as the multimedia format data. The executable instructions 526 may include a multimedia playback module 529 that is executable to convert multimedia file data retrieved from the memory array 594 to streaming multimedia data to be transmitted via the HDMI interface circuitry 510, by providing the multimedia file data to a decoder such as an MP3 CODEC to be decoded to generate streaming multimedia data. As illustrative examples, the streaming media capture module 528 can be the streaming media capture module 310 of FIG. 3 and the multimedia playback module 529 can be the video playback module 312 of FIG. 3.

Alternatively, or in addition, at least some of the executable instructions 526, including the streaming media capture module 528, the multimedia playback module 529, or any portion or combination thereof, may not be stored at the ROM 524 and may instead be stored at the memory array 594. The executable instructions 526 may be retrieved from the memory array 594 and stored at the RAM 522. The processor core 530 may be configured to retrieve the executable instructions including the streaming media capture module 528, the multimedia playback module 529, or any portion or combination thereof, from the RAM 522 for execution.

The executable instructions 526, such as the streaming media capture module 528 and the multimedia playback module 529, may be retrieved by the load/store unit 534 and stored to the instruction cache 532. The instructions included in the streaming media capture module 528 or the multimedia playback module 529 at the instruction cache 532 may be scheduled and provided to one or more execution pipelines, such as an execution pipeline including the ALU unit 536. The ALU unit 536 may include dedicated circuitry to perform arithmetic and logic operations, such as addition and subtraction, AND, NOT, OR, exclusive-OR (XOR), other arithmetic or logic operations, or any combination thereof.

The register file 538 may include multiple memory cells that provide high speed access to the processor core 530 of data to be used for execution of instructions. One or more memory cells at the register file 538 may be dedicated to store a status indicator, such as an indicator identifying whether the multimedia storage device 502 is coupled to a streaming multimedia source or to a multimedia sink. A determination that the multimedia storage device 502 is coupled to a streaming multimedia source or sink may be made by detecting a received clock signal at the HDMI interface circuitry, such as via clock differential channel signaling at the connectors 512, by detecting a voltage at a hot-plug connection at one or more of the connectors 512, or by detecting a power level, such as a voltage supply power level, at one or more of the connectors 512.

Thus, the processor core 530 may be programmed to perform at least a portion of the method 400 of FIG. 4. For example, the processor core 530 may be programmed to determine whether streaming multimedia data is incoming from an external device via the host interface circuitry 510 by detecting a connection of the multimedia storage device 502 to an external device via the HDMI interface circuitry 510, such as at the connectors 512, and detecting streaming multimedia data incoming from the external device via the connectors 512. The processor core 530 may be programmed with and may execute the streaming media capture module 528, in response to detecting the incoming streaming multimedia data to store a multimedia file, by converting the incoming streaming multimedia data to a multimedia file format and storing the converted streaming multimedia data in the multimedia file format as a multimedia file at the memory array 594. The processor core 530 may be programmed with and may execute the multimedia playback module 528 in response to detecting the connection to the external device but not detecting incoming streaming multimedia data by converting data stored at a multimedia file to streaming multimedia data and transmitting the streaming multimedia data via the HDMI interface circuitry 510.

In a particular embodiment, the USB interface circuitry 560 includes bus connectors (not shown) coupled to input/output (I/O) buffers and latches (not shown). The bus connectors may also be coupled to output driver circuitry (not shown). The USB interface circuitry 560 may also include a controller (not shown). The USB interface circuitry 560 may operate in accordance with a universal serial bus (USB) protocol. For example, the controller may be programmed to receive USB protocol instructions and data from an external device, such as a host device (not shown) via the bus connectors that are coupled to a universal serial bus. The controller may include a hardware processor that executes instructions stored at an internal memory, such as a read-only memory (not shown) to enable receipt and acknowledgment of USB instructions and data. Alternatively, or in addition, the USB interface circuitry 560 may be configured to support other communication protocols, such as a Secure Digital (SD) protocol, a small computer system interface (SCSI), parallel interface (SPI), a Compact Flash (CF) protocol, one or more other protocols, or any combination thereof.

The storage interface circuitry 540 may include data bus connectors 542, an output driver 544, input/output buffers and latches 546, and error correcting code (ECC) circuitry 548. The data bus connectors 542 may include electrical connectors to enable electrical signal transmission via the bus 506. The I/O buffers and latches 546 may be configured to store data that is received via the DMA/bus controller 520 to be transmitted via the bus 506 using electrical signals at the data bus connectors 542 that are generated by the output driver 544. In addition, or alternatively, the I/O buffers and latches 546 may store data values represented by electrical signals received at the data bus connectors 542 via the data bus 506, such as signals generated by the interface circuitry 590 of the storage component 508.

The ECC circuitry 548 may include dedicated hardware and circuitry configured to perform operations using data and error correcting code information received from the storage component 508 and may perform logical or arithmetic operations to verify that the received data is not detected to have corrupted values. For example, the received data may include additional bits representing an error correcting code, which may be encoded based on values of the data upon storage at the memory array 594. Corruption of one or more bits of the data, or one or more bits of the error correcting code, may be detectable by the ECC circuitry 548. For example, the storage interface circuitry 540 may include a flash memory interface, and the ECC circuitry 548 may be compliant with one or more flash error correcting code protocols.

Although various components depicted herein are illustrated as block components and described in general terms, such components may include one or more microprocessors, state machines, or other circuits configured to enable the data storage device 104 of FIG. 1, the data storage device 204 of FIG. 2, or the data storage device 304 of FIG. 3 to perform the particular functions attributed to such components, or any combination thereof. For example, the controller 118, the streaming media input detector 108, or both, of FIG. 1 may represent physical components, such as hardware controllers, state machines, logic circuits, or other structures to enable the data storage device 104 of FIG. 1 to detect whether streaming multimedia data is incoming from an external device via the multimedia interface connector 106.

For example, the streaming media input detector 108 may be implemented using a microprocessor or microcontroller programmed to determine whether a clock signal or hot-plug connection signal is received at the multimedia interface connector 106. In a particular embodiment, the streaming media input detector 108 of FIG. 1 includes executable instructions that are executed by a processor and the instructions are stored at the memory 114. Alternatively, or in addition, executable instructions that are executed by a processor that may be included in the streaming multimedia input detector 108 may be stored at a separate memory location that is not part of the memory 114, such as at a read-only memory (ROM) (not shown).

The multimedia storage device 502 may be a portable device configured to be selectively coupled to one or more external devices. However, in other embodiments, the multimedia storage device 502 may be attached or embedded within one or more host devices, such as within a housing of a portable communication device. For example, the multimedia storage device 502 may be within a packaged apparatus such as a wireless telephone, personal digital assistant (PDA), gaming device or console, portable navigation device, or other device that uses internal non-volatile memory. The multimedia storage device 502 may include a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    in a portable storage device that includes a multimedia interface connector:
        detecting, based on a first signal received via the multimedia interface connector, a connection of the portable storage device to an external device via the multimedia interface connector;
        in response to detecting the connection, determining based on a second signal received via the multimedia interface connector whether streaming multimedia data is incoming from the external device via the multimedia interface connector; and
        in response to determining that the streaming multimedia data is incoming from the external device activating one or more first components of the portable storage device to:
            encode the streaming multimedia data at an encoder to generate a multimedia file having a multimedia file format; and
            store the multimedia file at a memory device; and
        in response to determining that no streaming multimedia data is incoming from the external device, activating one or more second components of the portable storage device to:
            decode data stored at the memory device using a decoder to generate second streaming multimedia data; and
            transmit the second streaming multimedia data via the multimedia interface connector.

2. The method of claim 1, wherein the multimedia interface connector is a High-Definition Multimedia Interface (HDMI) connector.

3. The method of claim 1, wherein the first signal includes a hot-plug connection signal.

4. The method of claim 1, wherein the second signal indicates a power level.

5. The method of claim 1, wherein the second signal includes a clock signal.

6. The method of claim 1, wherein the second signal includes a hot-plug connection signal.

7. The method of claim 1, wherein the second signal includes at least one of a video signal and an audio signal.

8. The method of claim 1, wherein the portable storage device includes a video compression circuit that is coupled to the multimedia interface connector and wherein the streaming multimedia data is converted to the multimedia file format by the video compression circuit.

9. The method of claim 1, wherein the incoming streaming multimedia data includes a video feed from a video source.

10. The method of claim 1, wherein the multimedia interface connector is a High-Definition Multimedia Interface (HDMI) connector and wherein the second streaming multimedia data is transmitted to a television having a HDMI port.

11. The method of claim 1, further comprising in response to determining that no streaming multimedia data is incoming, transmitting the second streaming multimedia data based on a most recently stored multimedia file at the portable storage device.

12. The method of claim 1, further comprising in response to determining that no streaming multimedia data is incoming, transmitting the second streaming multimedia data based on an earliest stored multimedia file at the portable storage device.

13. A data storage device comprising:
    a memory;
    a controller coupled to the memory and configured to detect a connection of the data storage device to an external device via a multimedia interface connector based on a signal received via the multimedia interface connector;
    a streaming media capture circuit coupled to the controller;
    a video playback circuit coupled to the controller; and
    selection circuitry coupled to the video playback circuit and the streaming media capture circuit;
    wherein the multimedia interface connector is coupled to the selection circuitry, the streaming media capture circuit, and the video playback circuit,
    wherein in response to detecting streaming multimedia data incoming from the external device via the multimedia interface connector, the selection circuitry enables the streaming media capture circuit to generate multimedia file format data from the incoming streaming multimedia data,
    wherein in response to detecting that no streaming multimedia data is incoming, the selection circuitry enables the video playback circuit to output second streaming multimedia data to the external device via the multimedia interface connector, and
    wherein the controller is configured to store the multimedia file format data to the memory as a multimedia file.

14. The data storage device of claim 13, wherein the multimedia interface connector is a High-Definition Multimedia Interface (HDMI) connector.

15. The data storage device of claim 13, wherein the streaming media capture circuit includes a video compression circuit.

16. The data storage device of claim 13, further comprising an external switch coupled to the selection circuitry, wherein the selection circuitry is responsive to a state of the external switch to selectively enable the video playback circuit or the streaming media capture circuit.

17. The data storage device of claim 13, further comprising an external power connector distinct from the multimedia interface connector and coupled to the selection circuitry, wherein the selection circuitry is responsive to the external power connector being coupled to an external power source to selectively enable the video playback circuit or the streaming media capture circuit.

18. The data storage device of claim 13, wherein the controller is configured to initiate retrieval of the multimedia file format data from the multimedia file that is stored at the memory, and wherein the controller is further configured to provide the multimedia file format data to the video playback circuit.

19. A data storage device comprising:
a multimedia interface connector;
a controller coupled to the multimedia interface connector; and
a memory coupled to the controller,
wherein the controller is configured to detect a connection of the data storage device to an external device via the multimedia interface connector based on a signal received via the multimedia interface connector,
wherein, when the external device is a multimedia source, the controller is configured to initiate a streaming multimedia capture operation in response to detecting that streaming multimedia data is incoming from the multimedia source wherein the streaming multimedia capture operation includes encoding the incoming streaming multimedia data at an encoder to generate a multimedia file having multimedia file format data and storing the multimedia file to the memory, and
wherein, when the external device is a multimedia receiver, the controller is configured to initiate a multimedia playback operation to output second streaming multimedia data via the multimedia interface connector to the multimedia receiver.

20. The data storage device of claim 19, further comprising a second connector coupled to the controller, and wherein the controller is configured to provide at least one of a file read access or a file write access to the memory via the second connector.

21. The data storage device of claim 19, wherein the multimedia playback operation includes converting the multimedia file format data that is stored at the memory to the second streaming multimedia data that is provided to the multimedia interface connector.

22. The data storage device of claim 19, wherein the streaming multimedia capture operation processes the incoming streaming multimedia data according to a first streaming protocol and wherein multimedia data is generated during the multimedia playback operation according to the first streaming protocol.

23. The data storage device of claim 19, wherein the controller is configured to send navigation menu data to the multimedia receiver to be displayed at a display that is coupled to the multimedia receiver, wherein the navigation menu data is displayed at a navigation menu that enables a selection of the multimedia file that is stored at the memory.

24. The data storage device of claim 23, further comprising at least one user input device coupled to the controller, wherein the controller is responsive to a state of the at least one user input device to modify the navigation menu data.

25. The data storage device of claim 24, wherein the controller is further responsive to a control input from a remote input device.

* * * * *